(12) United States Patent
Masters

(10) Patent No.: US 6,485,536 B1
(45) Date of Patent: Nov. 26, 2002

(54) VORTEX PARTICLE SEPARATOR

(75) Inventor: Steven E. Masters, Boise, ID (US)

(73) Assignee: Proteam, Inc., Boise, ID (US)

( * ) Notice: Subject to any disclaimer, the term of this patent is extended or adjusted under 35 U.S.C. 154(b) by 0 days.

(21) Appl. No.: 09/710,247

(22) Filed: Nov. 8, 2000

(51) Int. Cl.[7] .......................... B01D 50/00; B01D 45/12
(52) U.S. Cl. ............................ 55/337; 55/426; 55/429; 55/452; 55/457; 55/467; 55/DIG. 3
(58) Field of Search ..................... 55/337, 426, 429, 55/452, 456, 457, 467, DIG. 3; 15/353

(56) References Cited

U.S. PATENT DOCUMENTS

| | | | |
|---|---|---|---|
| 3,693,791 A | 9/1972 | Beck | 209/144 |
| 3,875,061 A | 4/1975 | Palma | 210/223 |
| 4,008,059 A | 2/1977 | Monson et al. | 55/396 |
| 4,043,513 A | 8/1977 | Hoberg et al. | 241/24 |
| 4,162,906 A * | 7/1979 | Sullivan et al. | 210/512.1 |
| 4,581,050 A | 4/1986 | Krantz | 55/269 |
| 5,028,318 A | 7/1991 | Aslin | 210/85 |
| 5,080,697 A | 1/1992 | Finke | 55/97 |
| 5,120,335 A | 6/1992 | Gorlich et al. | 55/457 |
| 5,137,554 A | 8/1992 | Carter, Jr. | 55/399 |
| 5,224,604 A | 7/1993 | Duczmal et al. | 209/12 |
| 5,254,147 A | 10/1993 | Finke | 55/337 |
| 5,267,371 A | 12/1993 | Soler et al. | 15/327.5 |
| 5,468,174 A | 11/1995 | Bachand et al. | 451/75 |
| 5,470,465 A | 11/1995 | Moorehead et al. | 210/205 |
| 5,968,231 A | 10/1999 | Parmentier et al. | 92/28 |
| 5,972,215 A | 10/1999 | Kammel | 210/243 |
| 6,026,540 A | 2/2000 | Wright et al. | 15/347 |
| 6,070,291 A | 6/2000 | Bair et al. | 15/347 |
| 6,083,292 A * | 7/2000 | Fumagalli | 55/345 |
| 6,428,589 B1 * | 8/2002 | Bair et al. | 55/318 |

* cited by examiner

Primary Examiner—Robert A. Hopkins
(74) Attorney, Agent, or Firm—Robert L. Shaver; Frank J. Dykas; Stephen M. Nipper

(57) ABSTRACT

The invention is a particle separator which separates entrained particulates from a fluid. The particle separator utilizes an auger enclosed within a cylinder to form a cyclonic chamber, through which air is propelled. The centrifugal motion of particles within the air causes the particles to exit the cyclonic chamber through ducts, and the particles are separated in collection chambers.

47 Claims, 12 Drawing Sheets

VORTEX PARTICLE SEPARATOR

BACKGROUND OF THE INVENTION

1. Field of the Invention

The present invention generally relates to devices which separate particulates from flowing fluids, and more specifically to vacuum cleaners which use centrifugal force for particle separation, such as cyclonic or vortex vacuum cleaners.

2. Background Information

There are a large number of designs of vacuum cleaners, but two basic styles are prominent. One of these styles is a vacuum which utilizes a bag to collect filtered dirt. The bag serves as the filter and accumulates dust until full, at which time it is emptied. A stream of air is drawn into the bag, and pores in the bag wall stop particles which are in the air, but allow air to exit the bag. A problem with vacuums which utilize bags, is that the bag must be somewhat porous in order to allow the passage of a large flow of air. Bags which are fairly porous can also allow the passage of a large volume of particulates. As much as 40% of the dust can pass through such a bag and reenter the house, suspended in air currents, until it settles out.

As soon as the vacuum cleaner begins to accumulate dust, the pores of the bag begin to be blocked, and the air flow decreases. As the air flow decreases, the vacuum cleaner floor tool can pass over particles, and the air flow may not be enough to lift them off the surface and into the vacuum cleaner. As the bag fills with particles, the volume of air flow becomes less and less, and the filtration power of the vacuum bag becomes more and more, until the filtration efficiency is so high that not even air can exit the bag. Another disadvantage of bag systems is the expense and messiness of a bag. When a bag is full of dirt, the vacuum cleaner must be opened and the bag removed and replaced with a new one. If large numbers of bags are used, the expense of new bags is undesirable.

Still another problem with vacuums which use a bag is that users will try to continue using the vacuum as long as there is space in the bag to hold more dirt. However, a bag may be totally used up by filtering a small amount fine dust particles. These fine powders can completely block every pore in the filter bag, and reduce the air flow through the filter bag to zero. A user may be dissatisfied with the vacuum when he opens the filter and finds that it is not full of dirt, but merely has a small amount of dirt on the inside of the bag. Some users may continue trying to use a vacuum in such a state, either not understanding that the usefulness of the bag has ended, or trying to conserve money by getting the most life out of every bag.

A second type of vacuum cleaner uses cyclonic separation of particulates from the air. The typical cyclonic vacuum cleaner is configured so that a stream of air enters a vacuum chamber at a tangent to the cylindrical wall of the vacuum chamber. The air circulates around the wall of the container, with the heavier particles moving adjacent to the wall or bouncing against the wall, and the swirling air in the center of the chamber being more free of particulate matter. An air intake tube to the motor and fan is typically located at the bottom of the canister and runs vertically through the center of the canister, so that the cleaner central air is drawn into the central intake tube, and is drawn back towards the top of the container, where it may exit the vacuum cleaner. In many cyclonic designs, a supplemental filter is also placed so that air is filtered through a particulate filter before exiting the vacuum cleaner.

Examples of cyclonic vacuum cleaners include that described in U.S. Pat. No. 5,080,697, to Fink.

Another type of cyclonic vacuum cleaner is shown in U.S. Pat. No. 6,026,540 to Wright et al. In Wright, as shown in FIG. 4, air enters the vacuum chamber at J and circulates spirally around the dirt cup 52. Dirt accumulates in the bottom of the dirt cup as the heavier particulates fall out of the air stream. A main filter element K is situated in the center of the cyclonic air flow chamber 54, and the cleaner air from the center of the spiraling air stream enters the main filter element K, and is drawn by a vacuum motor into an exhaust channel 60. As can be seen, the cyclonic effect serves to keep heavier particles out of the filter element K. However, it is the fine particles which will occlude the filter and stop air flow, and the filter can be clogged and ineffective long before the dust cup 52 is full.

One type of cyclonic vacuum cleaner is that sold by Hoover as the Vortex model. In the Hoover vacuum cleaner, air enters a cyclonic chamber tangentially, and spins around the side of the cylindrical chamber. Heavier particles fall to the bottom of this chamber and out of the main air flow. Air is drawn from the center of this cylindrical chamber and passes to a second stage centrifugal separating chamber which is stacked on top of the first stage. Particles which travel around the outside circumference of the second cylindrical chamber are again separated from the main air stream, and air from the center of the chamber goes into a third centrifugal or cyclonic separation chamber. This chamber is also stacked on top of the previous chamber, and further separates particles from air in the center of the chamber.

Another example of prior art cyclonic vacuums is a vacuum made by Eureka, and sold as the True HEPA Model. This vacuum cleaner is an upright, with a clear chamber in the center of the upright portion of the vacuum. Visible inside the clear chamber is what appears to be a funnel on the right, and a collection chamber in the left side. The funnel is actually a cyclonic chamber, in which air enters at a tangent and spins around the funnel, finally exiting at the bottom of the funnel. As the air enters the funnel, it is spinning, and large particles that are suspended in the air are expelled from the air stream before they enter the funnel. The large particles enter a chamber off to one side of the funnel which collects these large particles. The particles which are not separated in this initial separation chamber continue on through the funnel, and eventually encounter a filter which filters particulates before the air stream enters the fan. The Eureka vacuum is typical of a large number of cyclonic vacuums, in which a centrifugal or cyclonic chamber is used as a prefilter, to separate larger particles from the air stream, and a pleated paper or fibrous filter is utilized to filter the fine particles out of the air stream. The Phantom is another example of this type of filtration.

It is an object of the invention to provide a bagless particle separator based on cyclonic separation of particles. It is a further object to provide a high efficiency separation device which separates particles from moving fluid, and sorts the particles according to size. It is a further object to provide a vacuum cleaner which operates without bags, and which efficiently separates particles from air.

SUMMARY OF THE INVENTION

These and other objects are achieved by a vortex particle separator. The vortex particle separator is a highly effective particle separator for use in a vacuum cleaner. It is also useful in any situation in which particles need to be removed from a fluid flow. This can include use as a room air purifier, to remove smoke particles, pollen and dust from the room air. It is also effective at separating particles from air in industrial situations, such as in a smoke stack, either as a prefilter for a bag house, or as a replacement for bag filters. This vortex separator can also be used to sort materials by size.

The vortex particle separator utilizes a cyclonic chamber which is an auger or spiral ramp, confined within a cylindrical tube. Air is drawn through this cyclonic chamber, and particles which move to the periphery of the cyclonic chamber exit the cyclonic chamber by centrifugal force, and are captured in a collection chamber.

In its simplest format, the vortex particle separator utilizes a single stage for separation of particles. In this version of the vortex particle separator, a housing encloses the cyclonic chamber. The housing has an intake port and an exhaust port, and the housing may be closed at top and bottom, forming an enclosed chamber. The housing can be a rigid chamber, such as a plastic or metal chamber, and it can also be made of a flexible material, such as paper, fabric or plastic. The housing of the vortex particle separator can be porous or non-porous. If porous it would typically be a paper, fabric, and or a fabric bag. The housing may include a mechanism for opening and closing the top and bottom end of the housing.

Within the housing is located an auger or spiral ramp. The spiral ramp is enclosed by a cylindrical tube, called the core shroud. The spiral ramp enclosed within the cylindrical core shroud forms the cyclonic chamber. The spiral ramp has an inside edge and an outside edge, with the outside edge adjacent to the inside edge cylindrical core shroud, and sealed against the core shroud. The cylindrical core shroud has an interior surface and an exterior surface, and encloses the spiral ramp or auger. The core shroud and the spiral ramp form a pathway for air through the housing, and confine the air to the spiral pathway of the cyclonic chamber.

The cyclonic chamber includes a means of excluding particulates from the cyclonic chamber. This can include a means of keeping particulates from entering the cyclonic chamber, or a means of expelling the particulates after they have entered the cyclonic chamber, or both. The cyclonic chamber can terminate before it connects to the intake port of the housing, so that there is space between the beginning of the cyclonic chamber and the inlet of the housing. This space forms a gap or debris opening and allows the passage of large particulates out of the air flow and into the housing. The cyclonic chamber attaches to an air outlet of the housing, through which air exits the cyclonic chamber and the housing. A suction creating means is included, and is typically a motor with a fan. The fan propels air through the cyclonic chamber and through the housing. A means of connecting the fan and motor to the housing is also included, such as by direct attachment to the motor shaft, or by belt, chain, or gear connection.

If the cyclonic chamber is spaced apart from the air inlet of the housing, then the air propulsion means is mounted adjacent to the air outlet of the housing. When the air propulsion means, typically a fan and motor, is activated, a stream of air races through the cyclonic chamber, and forms a vortex of air beyond the inlet to the cyclonic chamber and extending into the air inlet of the housing. As air and particulates enter this vortex, the air assumes a spiraling pathway as it passes through the air inlet. Since there is a gap between the air inlet and the inlet to the cyclonic chamber, the heavier particles are thrown outside the cyclonic chamber and into the housing, and the air which enters the cyclonic chamber is free of these particulates.

A particulate filter may optionally be mounted between the air outlet of the housing and the fan.

A means is provided in the vortex particle separator to remove the accumulated particulate debris from the air chamber formed between the housing and the core shroud. The means of removing the particulates can be by removing the bottom of the housing, by removing the top of the housing, by having the housing split open in a clam shell fashion, or any other means which is typically used in the industry. If the housing is a flexible material, it can be disposed of with the dirt enclosed. The top of the housing would typically be an attached plate which includes the air inlet for the housing. A vacuum hose would typically be attached to the air inlet, and would extend to a floor tool or other intake or cleaning tool. The bottom of the housing may be removable, and may serve as a means of debris removal. In some configurations of the vortex particle separator, the air propulsion means could be mounted outside of the housing at the air inlet, and would push air through the cyclonic chamber.

In another version, the air propulsion means is mounted outside the housing and adjacent to the air outlet, and pulls air through the cyclonic chamber. The vortex particle separator can be configured to include a particulate filter in the air stream which exits the cyclonic chamber. The vortex particle separator can also be configured so that air speed is increased in the cyclonic chamber due to the spiral ramp and the cyclonic chamber decreasing in radius. This would cause air to move faster around the smaller radius, which would aid in separating smaller particulates. The air speed can increase through the cyclonic chamber by a change in pitch of the spiral ramp also. The vortex particle separator can also be configured so that air speed increases through the cyclonic chamber by the inner core of the cyclonic chamber increasing in diameter, so that there is less volume for air in the spiral ramp of the cyclonic chamber.

Another embodiment of the vortex particle separator can be constructed with all of the variations listed for the first embodiment, and which also includes a second stage for separation of particles separate from the first stage. The second stage could be divided from the first stage either by a partition which separates the two stages vertically from each other, or by a partition which separates the two stages horizontally from each other. Particle separation is more efficient when larger particles are removed first, and smaller particles are removed later. This is because the bouncing of the larger particles introduces turbulence into the airflow, and may disturb the path of the smaller particles. The multiple stages can also be used to sort particles by size in some applications.

A third embodiment of the vortex particle separator is a unit with three stages. This embodiment can have all of the variations noted for the previous two embodiments, and further includes three separate chambers for collection of particles of different sizes. These three chambers can be divided vertically from each other or horizontally.

Still other objects and advantages of the present invention will become readily apparent to those skilled in this art from the following detailed description wherein I have shown and described only the preferred embodiment of the invention, simply by way of illustration of the best mode contemplated by carrying out my invention. As will be realized, the invention is capable of modification in various obvious respects all without departing from the invention. Accordingly, the drawings and description of the preferred embodiments are to be regarded as illustrative in nature, and not as restrictive.

DESCRIPTION OF THE PREFERRED EMBODIMENTS

Figure 1:
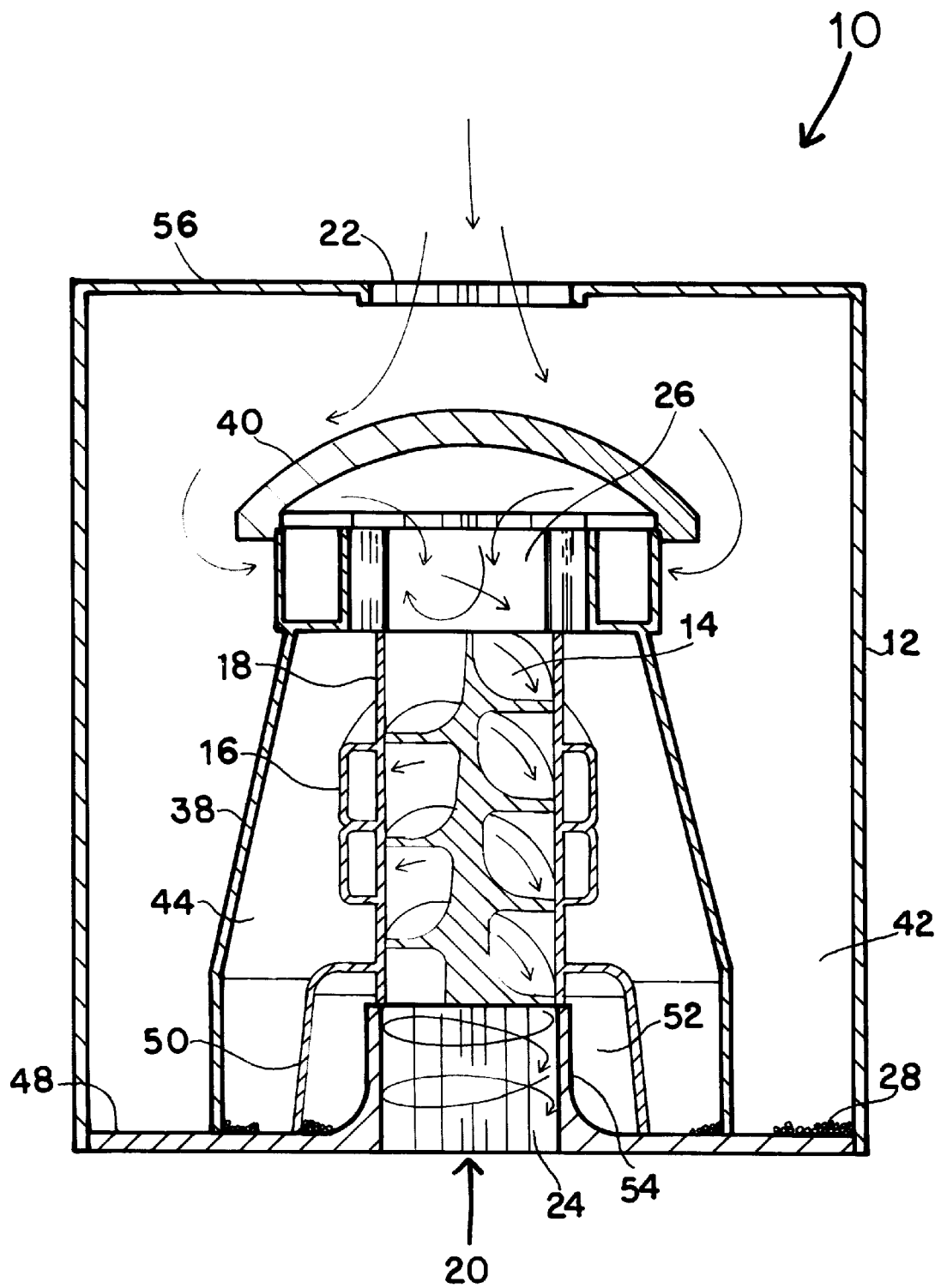
FIG. 1 is a cross sectional view of a three stage vortex particle separator.

While the invention is susceptible of various modifications and alternative constructions, certain illustrated embodiments thereof have been shown in the drawings and will be described below in detail. It should be understood, however, that there is no intention to limit the invention to the specific forms termed "preferred", but, on the contrary, the invention is to cover all modifications, alternative constructions, and equivalents falling within the spirit and scope of the invention as defined in the claims.

FIGS. 1–12 shows some of the preferred embodiments of the invention.

Figure 2:
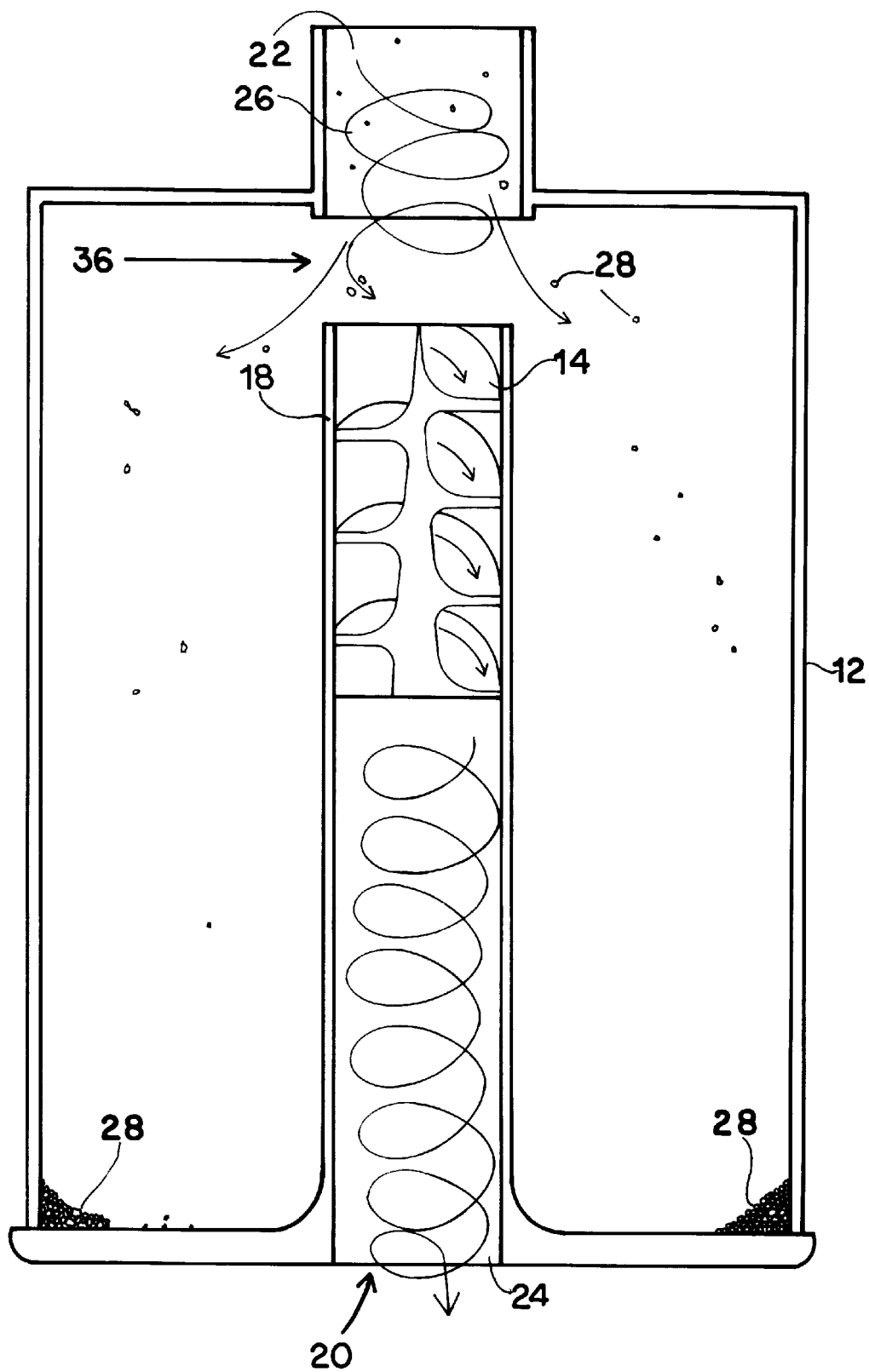
FIG. 2 is a cross sectional view of a single stage particle separator which utilizes a gap between the cyclonic chamber and the air inlet.

One preferred embodiment of the particle separator of the invention is shown in FIG. 2. This is a single stage particle separator. It includes a housing 12, in which is centrally located a spiral ramp 14, which is surrounded by a core shroud 18, in which the two form a cyclonic chamber 20. The housing 12 has an inlet 22 and an outlet 24. In this embodiment, a fan (not shown) driven by a motor (not shown) is mounted adjacent the air outlet 24. The fan pulls air through the cyclonic chamber and through the air inlet. The air inlet is attached to an air source (not shown), which can be an air hose, ducting, or simply a connection to a dust filled environment such as in a room or in an industrial stack. When the fan is activated, air is pulled through the cyclonic chamber and in a spiral pathway through the spiral ramp. A vortex 26 of air forms in the cyclonic chamber, and extends beyond the cyclonic chamber into the air inlet. As air enters the air inlet, it assumes the spiral shape of the vortex, and enters the housing 12 in this spiral pathway. Particles which are heavier than air are forced towards the periphery of the vortex, and when the air enters the housing 12, particles 28 are thrown out of vortex through the air gap 36 and into the housing 12. The efficiency of this single stage cyclonic filter depends on the speed of rotation of the vortex.

Figure 3:
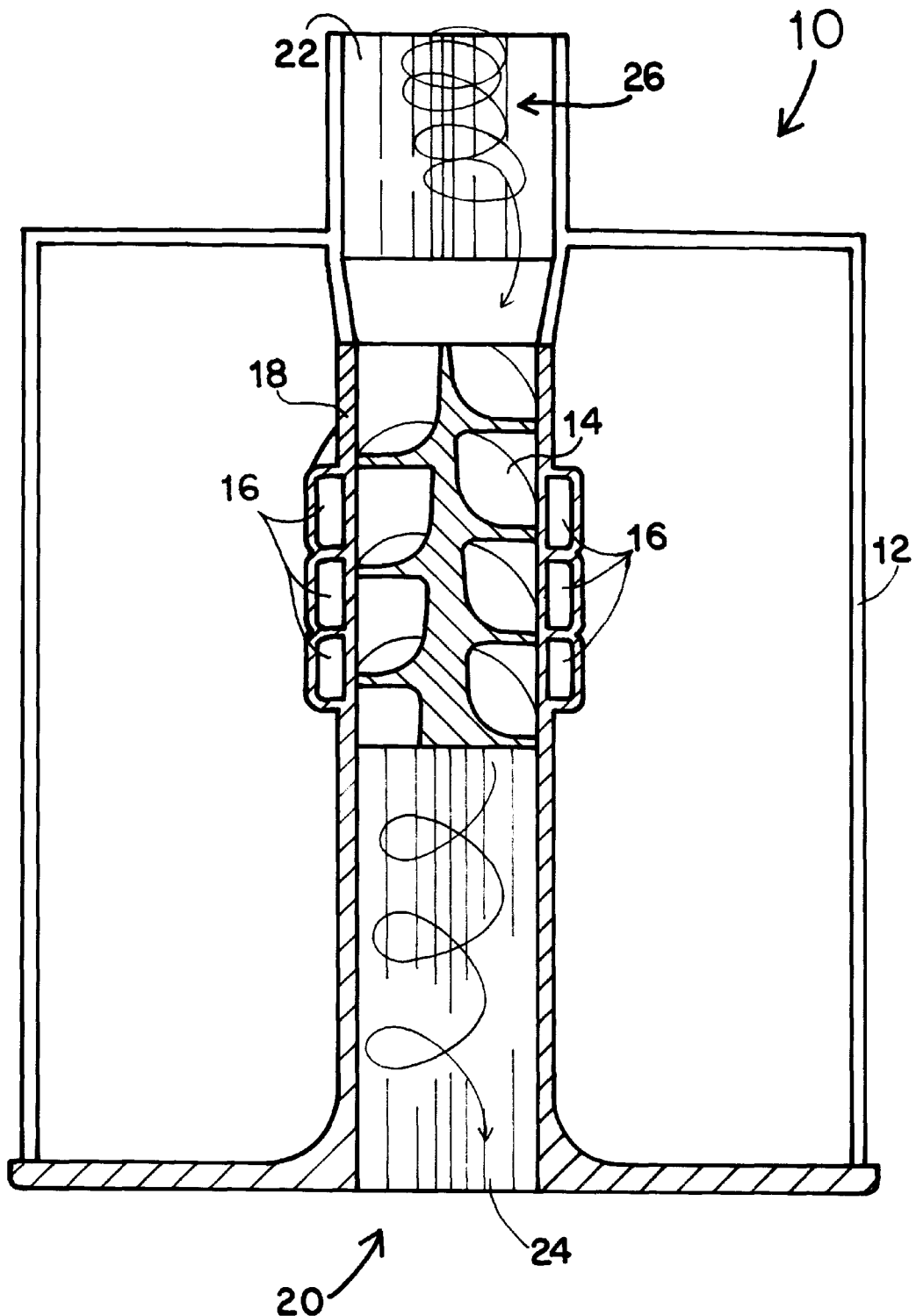
FIG. 3 is a cross sectional view of a single stage unit, which utilizes debris openings to remove particulates.

Another single stage version of the particle separator 10 is shown in FIG. 3. In this version, a vortex 26 is formed in the same way, and extends into the air inlet 22. However, there is no air gap 36, as there was in FIG. 2. FIG. 3, the means of removing particles from the air stream is by way of a number of debris openings 16. As in the device shown in FIG. 2, centrifugal force forces the particles 28 to the periphery of the vortex 26, where they exit the cyclonic chamber 20 through the debris opening 16. The features of the single stage separator of FIG. 2 can be combined with those of FIG. 3 to produce a device which includes an air gap 36 as well as one or more debris openings 16.

Figure 4:
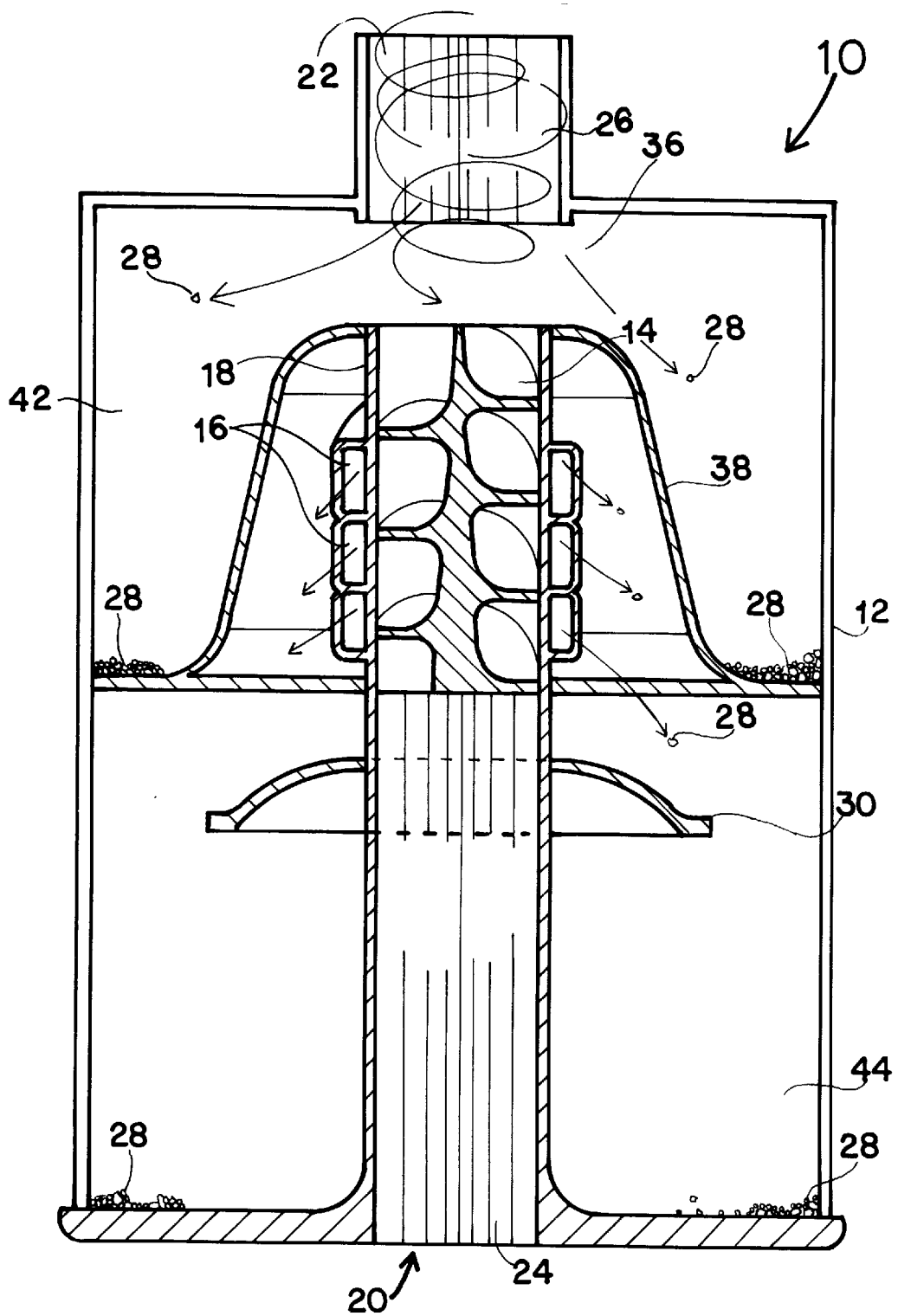
FIG. 4 is a cross sectional view of a two stage embodiment, in which the two stages are separated vertically.

FIG. 4 shows a two stage particle separator 10. This particle separator 10 includes a housing 12, a spiral ramp 14, a core shroud 18, which together with the spiral ramp 14 forms the cyclonic chamber 20. Debris openings 16 are also included. The device has an air inlet 22 and air outlet 24, and is attached to a motor (not shown) and a fan (not shown). An air gap 36 is present between the spiral ramp 14 and the air inlet 22. The device includes a compartment divider 38, which in this case is generally frustoconical in shape, and is attached at one end to the core shroud, and at the other end to the interior housing wall. The compartment divider 38 divides the housing into a first chamber 42 and a second chamber 44. In this version, a deflector plate 30 is mounted in the second chamber 44 around the cyclonic chamber 20. This deflector plate 30 serves to keep particles 28 in the lower part of the second chamber 44, and helps prevent them from being drawn back into the debris openings 16. In operation, this version of the particle separator 10 operates by forming a vortex in the cyclonic chamber, which extends into the air inlet. As air enters the housing, larger particles of debris 28 are thrown out through the air gap 36 into the first chamber 42. Particles which continue on with the vortex into the cyclonic chamber have another chance to exit the vortex through debris opening 16. Since there is less interaction between particles, and the air speed in the vortex increases as it approaches the air outlet, more particles, and smaller particles are separated through the debris openings 16 in the cyclonic chamber 20. Having more than one chamber allows for more efficient separation of particles, and also allows for sorting of material.

Another preferred embodiment is shown in FIGS. 1, 5a, 5b, and 6. This is a particular configuration of three stage particle separator. As shown in FIG. 1, this version of the particle separator 10 includes a housing 12, a spiral ramp 14, enclosed within a core shroud 18, to form a cyclonic chamber 20. Over the top of the cyclonic chamber is located a debris deflector or cyclonic chamber cap 40. The housing 12 has an air inlet 22 and an air outlet 24. This version of the device preferably uses a fan and a motor for propelling air, and the fan and motor may be mounted either adjacent to the air inlet or adjacent to the air outlet. A particulate filter (not shown) would typically be mounted operationally downstream from the air outlet 24 of the housing 12. This would serve the purpose of removing the very smallest particles which were not removed by the cyclonic chamber. The preferable configuration for this embodiment is to have the motor and fan mounted adjacent to the air outlet 24 of the housing 12, and to have a particulate filter (not shown) mounted downstream from the air outlet 24. In this configuration, air would be pulled through the cyclonic chamber 20 and would form a vortex in the cyclonic chamber. The flow of air would pull air in passages under the cyclonic chamber cap 40, and into the housing 12 through the air inlet 22. Larger particles 28 would fall into a first chamber 42. A second chamber 44 would be formed by a compartment divider 38 which is attached from the core shroud 18 to the housing floor 48. Debris opening 16 would allow passage of particles 28 into the second chamber 44. A second compartment divider 50 extends from the core shroud 18 to the housing floor 48, and forms a third chamber 52. A base 54 surrounds the air inlet 24, and abuts the core shroud 18 of the cyclonic chamber 20. The raised base 54 forms one wall of the third chamber 52, and at least one debris opening 16 provides communication between the cyclonic chamber and the third chamber 52.

In operation, this version of the device would deposit the larger particles in the first chamber 42, intermediate size particles in the second chamber 44, and the finest particles in the third chamber 52. The particles 28 could be removed from this device by removal of the housing floor 48. It may also be desirable to provide particle removal by opening the housing in a clam shell fashion, or by removing the housing top 56. Once the housing top 56 is removed, the entire structure inside can be removed from the housing floor 48, for disposal of particles 28.

Figures 5A, 5B:
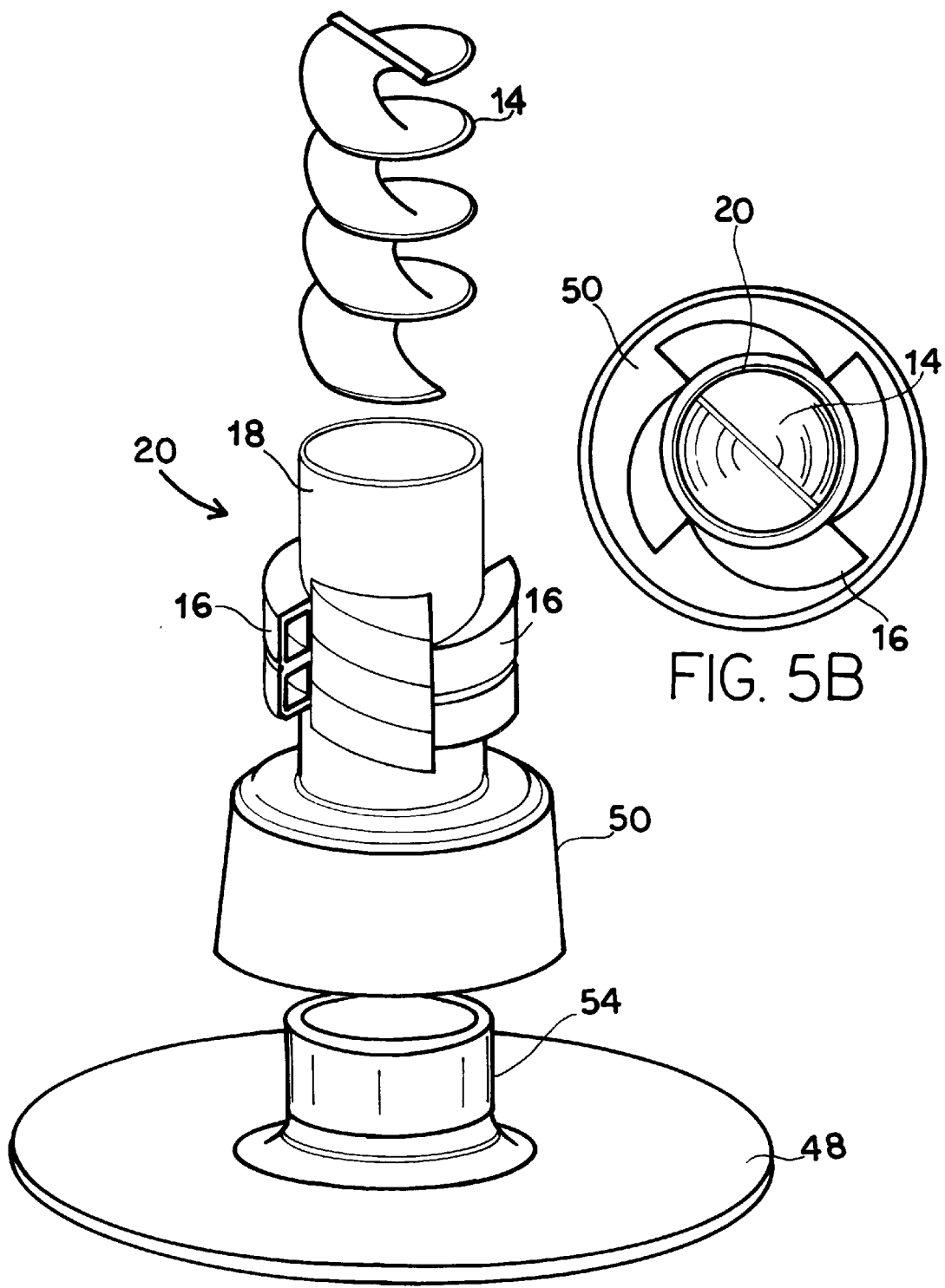
FIG. 5a is an exploded view of a vortex particle separator with the housing removed.
FIG. 5b is a top view of a vortex particle separator.

FIG. 5A shows and exploded view of the three stage version of the particle separator 10. Shown in FIG. 5A is the raised base 54, the housing floor 48, the second compartment divider 50, the cyclonic chamber 20 with the core shroud 18 and debris opening 16 visible, and a spiral ramp 14.

FIG. 5B is a top view of this device with housing removed, showing the cyclonic chamber 20, the spiral ramp 14, debris opening 16, and the housing floor 48.

Figure 6:
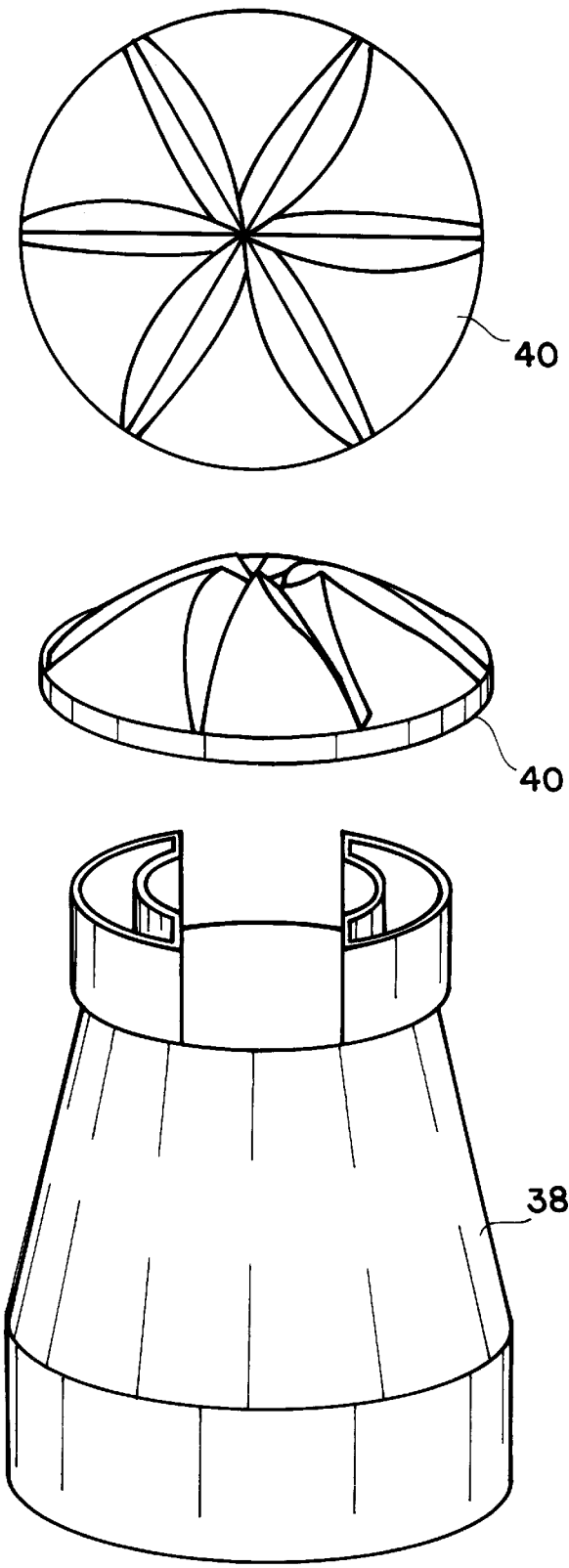
FIG. 6 is a perspective view of the compartment divider and debris deflector cap of a vortex particle separator.

FIG. 6 shows a view of the cyclonic chamber cap 40 in perspective and a top view, and the structure of the compartment divider 38.

Figure 7:
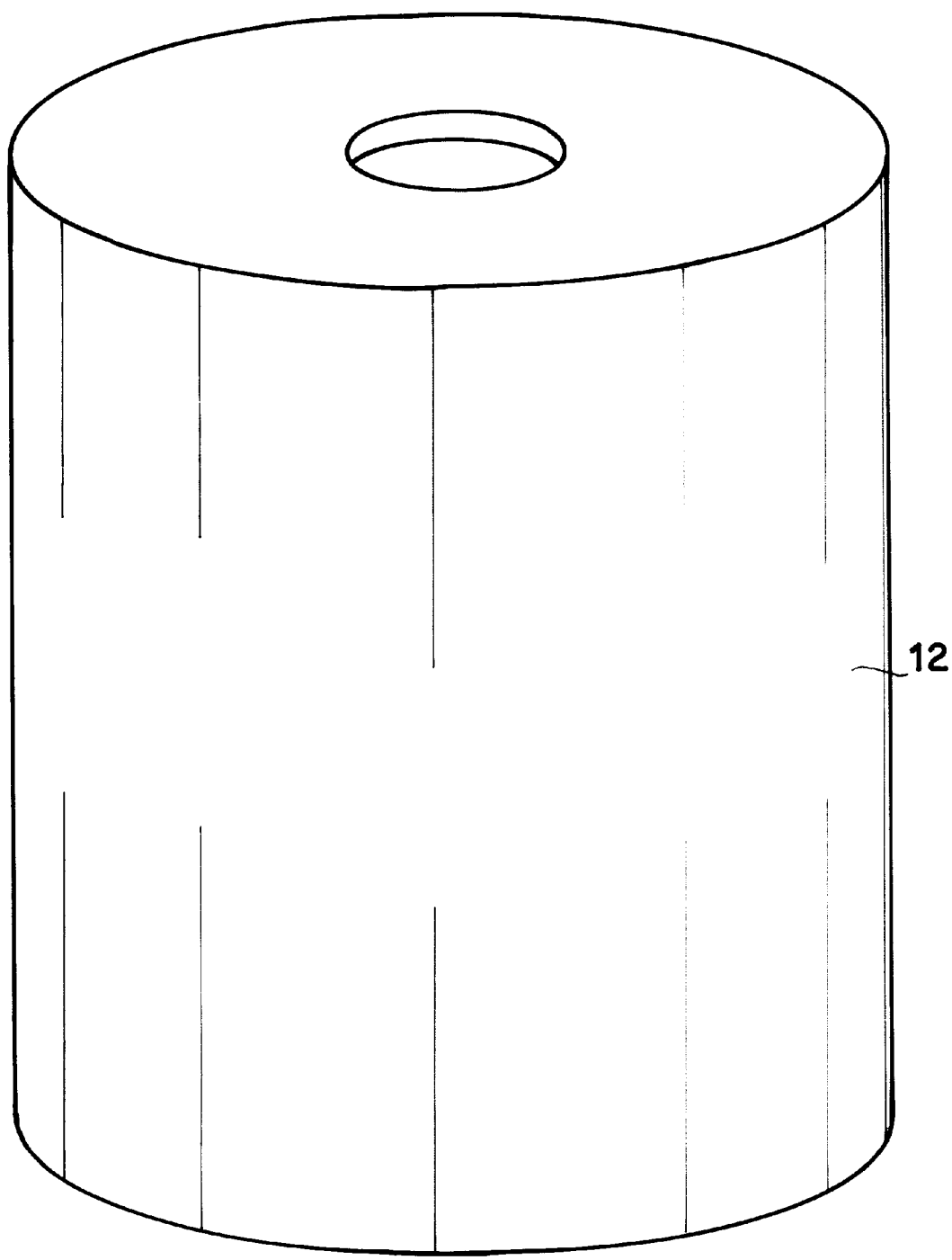
FIG. 7 is a perspective view of the housing of a vortex particle separator.

FIG. 7 shows the housing 12 which would fit on the three stage device of FIG. 1 The preferred embodiment of this device is a rigid plastic structure, but other preferred embodiments include rigid structures of metal and paper, and flexible and/or porous structures of fabric, paper, or plastic.

Figure 8:
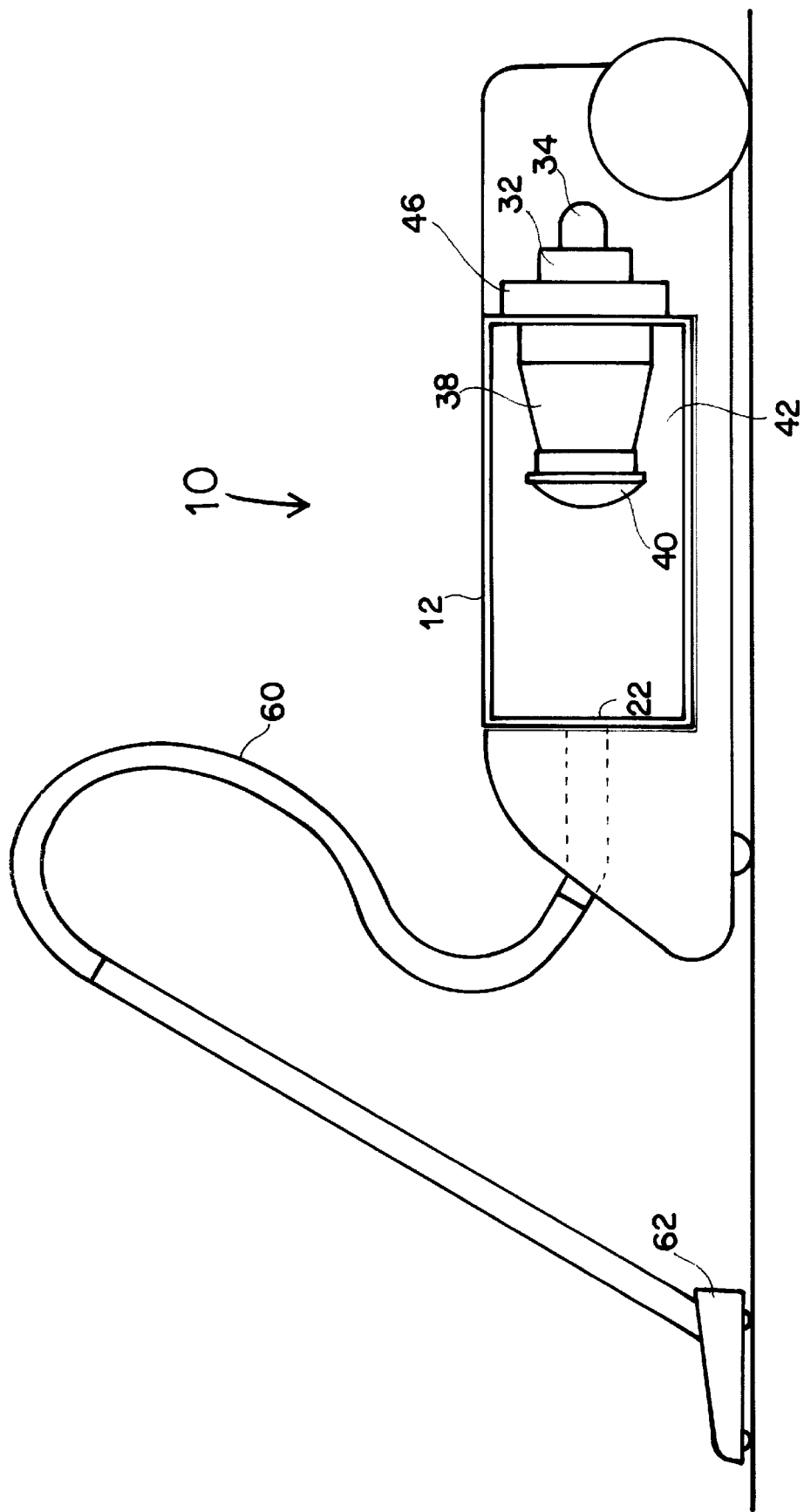
FIG. 8 is a side cut-away view of a vortex particle separator configured as a canister vacuum.

FIG. 8 shows the cyclonic separator of FIG. 1 mounted in a canister vacuum 58, and show the motor 34, a fan 32, and a particulate or HEPA filter 46. Also shown is the housing 12, the first chamber 42, the compartment divider 38, and the cyclonic chamber cap 40. An air inlet 22 is shown attached to a vacuum hose 60 with an attached floor tool 62.

Figure 9:
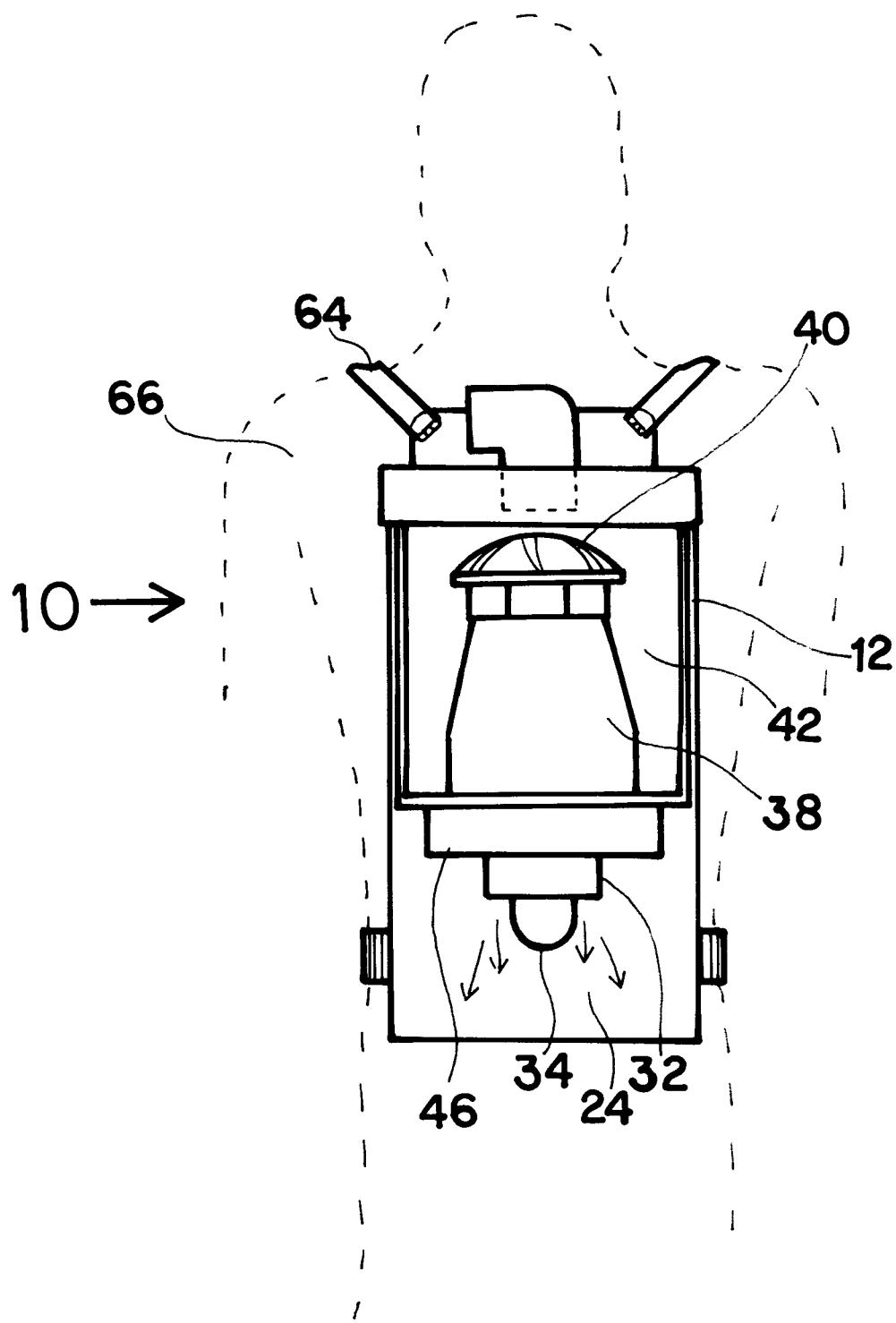
FIG. 9 is a front view of a vortex particle separator configured as a backpack vacuum.

FIG. 9 shows the embodiment of the three stage particle separator mounted in a backpack vacuum version. This version is worn with shoulder straps 64 by a user 66. It includes all of the features thus described, such as housing 12, the first chamber 42 being visible in this view, as well as the compartment divider 38. Shown is the preferred cyclonic chamber cap 40. A motor 34 and a fan 32 are shown, as well as a particulate filter or HEPA filter 46.

Figure 10:
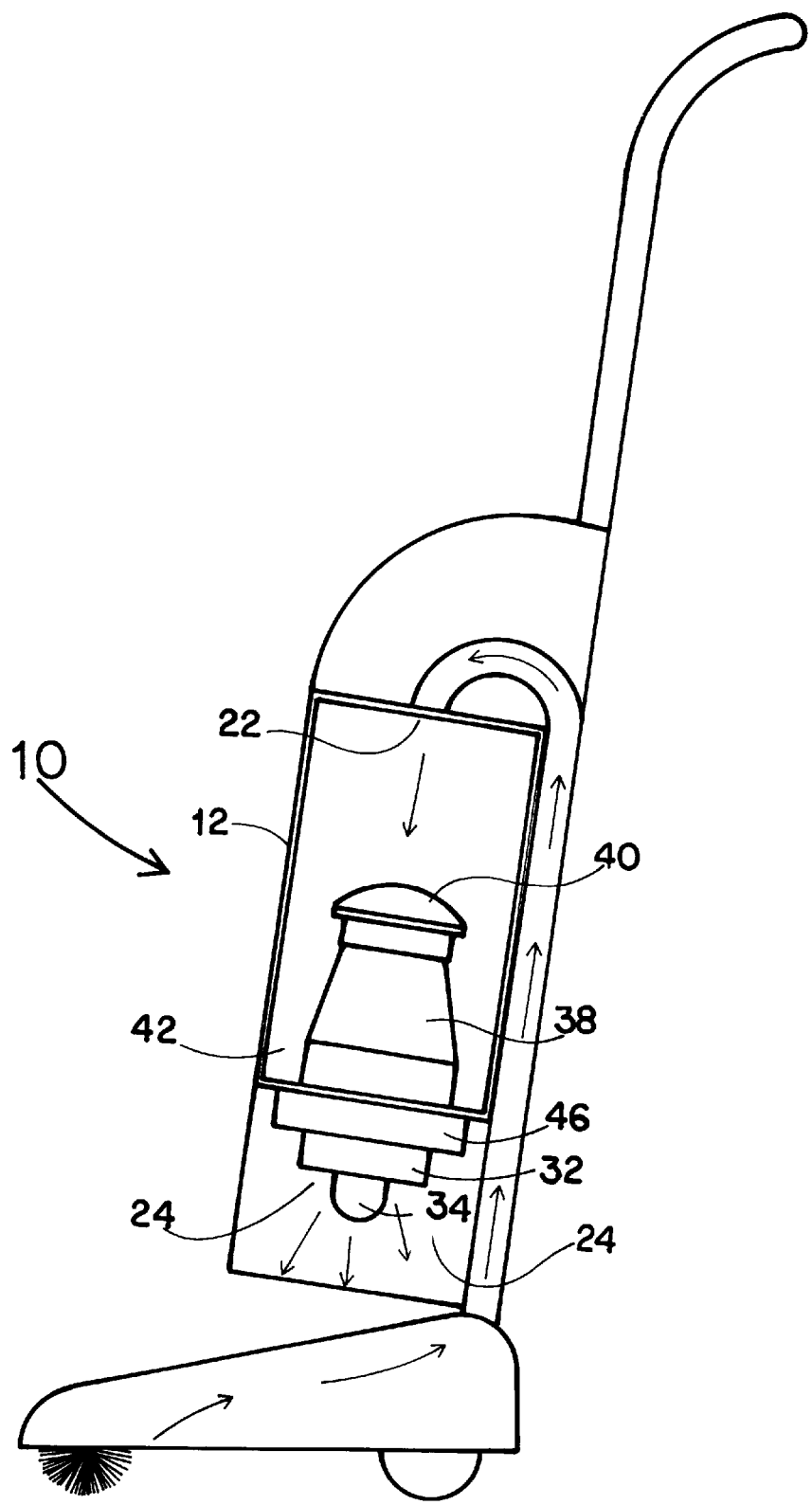
FIG. 10 is a side cut away view of a vortex particle separator configured as an upright vacuum.

FIG. 10 shows the three stage cyclonic separator of FIG. 1, mounted in an upright vacuum cleaner which utilizes all of the previously mentioned components.

Figure 11:
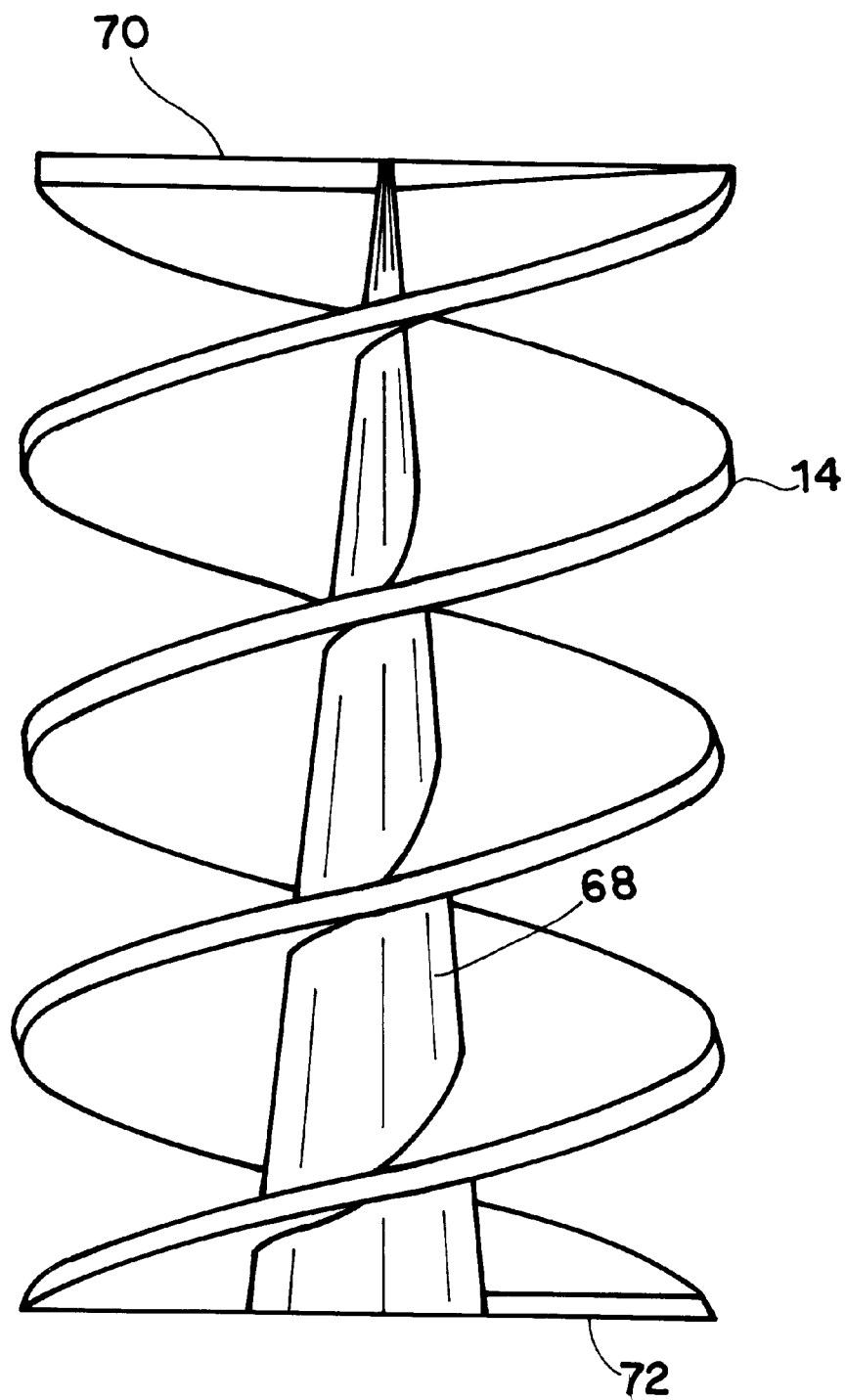
FIG. 11 is a side view of a spiral ramp with the core increasing in diameter to increase air speed.

FIG. 11 shows a one preferred version of the spiral ramp 14 which includes a ramp core 68. In this version of the spiral ramp, the ramp core increases in diameter from a first end 70 to a second end 72 of the spiral ramp 14. The first end 70 of the spiral ramp is mounted towards the air inlet, and the second end 72 of the spiral ramp is preferably mounted towards the air outlet. As air flows through this spiral ramp enclosed in the core shroud 18, the cross sectional diameter of the air path decreases, which causes an increase in air speed. This air of increased speed passes by debris opening 16, and increasingly smaller particles of air can be separated because of the increased air speed. This version of a spiral ramp can be used in all of the embodiments of the vacuum cleaner.

Figure 12:
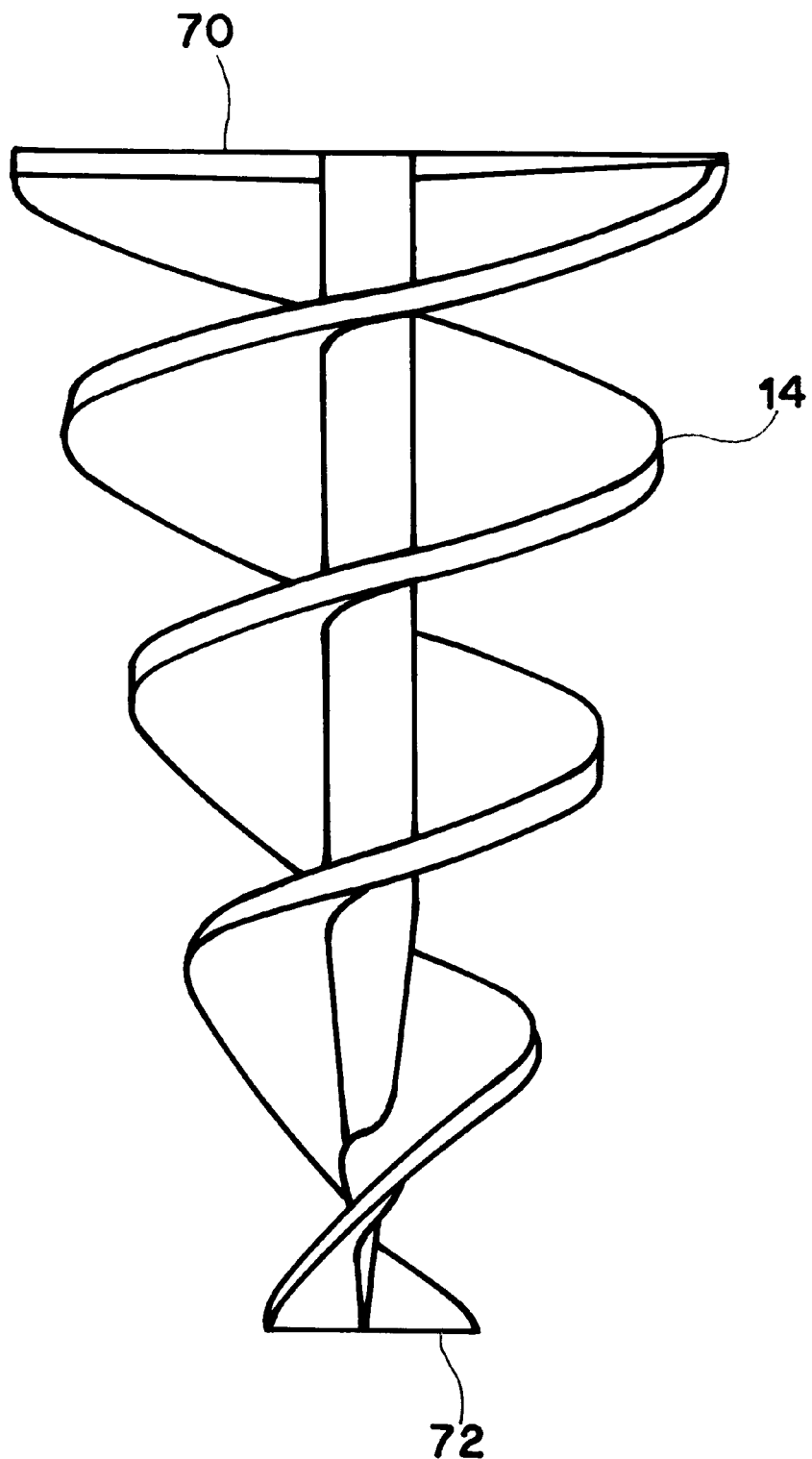
FIG. 12 is a side view of a spiral ramp with the spiral ramp decreasing in diameter to increase air speed.

FIG. 12 shows another design of the spiral ramp which increases air flow by decreasing the cross sectional diameter of the cyclonic chamber. In this unit, the first end of the spiral ramp 70 is wider in diameter than the second end of the spiral ramp 72. Air enters at the first end 70, and progresses towards the second end 72, increasing in speed as the diameter of the cyclonic chamber decreases.

While there is shown and described the present preferred embodiment of the invention, it is to be distinctly understood that this invention is not limited thereto but may be variously embodied to practice within the scope of the following claims. From the foregoing description, it will be apparent that various changes may be made without departing from the spirit and scope of the invention as defined by the following claims.

I claim:

1. A vortex particle separator, for separating entrained particulates from air, comprising:

a vacuum housing, with at least one sidewall, a top end and a bottom end;

at least one air inlet in said housing, for entry of air into said housing;

at least one spiral ramp enclosed by a generally cylindrical core shroud, in which said spiral ramp comprises a top end, and bottom end, and an inside edge and an outside edge, with said generally cylindrical core shroud comprising a sidewall with an interior surface and an exterior surface, said generally cylindrical core shroud surrounding and enclosing said spiral ramp, with said interior surface of said generally cylindrical core shroud adjacent to said outside edge of said spiral ramp and thereby confining air to a path formed by said spiral ramp, with said generally cylindrical core shroud forming an air chamber between said housing and said exterior surface of said generally cylindrical core shroud, and forming a cyclonic chamber inside said generally cylindrical core shroud, and in which said spiral ramp provides a spiral route for air movement through said cyclonic chamber, said sidewall of said generally cylindrical core shroud defining one or more debris openings located between flights of said spiral ramp, for extracting particulates from air moving through said spiral ramp in said core shroud;

a top portion of said housing;

a bottom portion of said housing;

a means of removing accumulated particulate debris from said air chamber;

an air propulsion unit for propelling air through said vacuum housing and out said air outlet; and an operative connection between said air propulsion unit and cyclonic chamber;

wherein said air propulsion unit propels air through said air inlet in said housing, and as air enters said spiral ramp said air is forced into a spiral path through said spiral ramp and said generally cylindrical core shroud, and entrained particulates in air are forced to a periphery of said spiral ramp by centrifugal force, and said particulates are excluded from said cyclonic chamber of said generally cylindrical core shroud to said air chamber by said one or more debris openings defined in said sidewall of said core shroud between flights of said spiral ramp, and when air passes from said housing through said air outlet it is substantially debris free.

2. The vortex particle separator of claim 1 in which said suction creating unit is a motor and a fan.

3. The vortex particle separator of claim 1 which further comprises one spiral ramp.

4. The vortex particle separator of claim 1 in which said vacuum housing is generally cylindrical in shape.

5. The vortex particle separator of claim 1 in which said air inlet is centered in said top of said vacuum housing, for axial and non-tangential entry of air into said vacuum housing.

6. The vortex particle separator of claim 1 in which said spiral ramp is centered in said housing.

7. The vortex particle separator of claim 1 in which said housing is a bag.

8. The vortex particle separator of claim 7 in which said bag is a porous bag.

9. The vortex particle separator of claim 7 in which said bag is a porous cloth bag.

10. The vortex particle separator of claim 7 in which said bag is a porous paper bag.

11. The vortex particle separator of claim 1 in which said housing is removable from said cyclonic chamber and serves as a means of debris removal.

12. The vortex particle separator of claim 1 in which said top of housing is an attached plate with an air inlet defined therein.

13. The vortex particle separator of claim 1 in which said bottom of housing is removable and serves as a means of debris removal.

14. The vortex particle separator of claim 1 in which said housing splits apart for debris removal.

15. The vortex particle separator of claim 1 in which said suction creating unit is mounted adjacent said air outlet and pulls air through said cyclonic chamber.

16. The vortex particle separator of claim 2 in which said motor is mounted adjacent said air inlet and pushes air through said cyclonic chamber.

17. The vortex particle separator of claim 1 in which said spiral ramp decreases in radius in order to increase air speed so that smaller particulates may be removed from said air stream.

18. The vortex particle separator of claim 1 in which a pitch of said spiral ramp decreases from said top end of said spiral ramp to said bottom end of said spiral ramp, in order to increase air speed toward said bottom end, so that smaller particulates may be removed from said air stream.

19. The vortex particle separator of claim 1 which said spiral ramp further comprises a central core, to which is attached said inner edges of said spiral ramp, and a diameter of said inner core is smaller at said top end, and becomes larger at said bottom end, for increasing air speed in said cyclonic chamber so that smaller particles may be removed from said air stream.

20. A vortex particle separator for removing entrained particulates from air, comprising:
a housing, with at least one sidewall, a top end and a bottom end, an interior side and an exterior side;
an air inlet in said housing, for entry of air into said housing;
a spiral ramp enclosed by a generally cylindrical core shroud, in which said spiral ramp includes a top end, and bottom end, and an inside edge and an outside edge;
with said generally cylindrical core shroud comprising an interior surface and an exterior surface, which surrounds and encloses said spiral ramp, and extends from said air inlet to an air outlet in said housing, with said interior surface of said generally cylindrical core shroud adjacent to said outside edge of said spiral ramp, and in which said generally cylindrical core shroud confines air to a path formed by said spiral ramp, with said generally cylindrical core shroud forming a first air chamber between said housing and said exterior surface of said generally cylindrical core shroud, and also forming a cyclonic chamber inside said generally cylindrical core shroud, in which said spiral ramp provides a spiral route for air movement through said cyclonic chamber;
a means of excluding particulates from said cyclonic chamber;
a compartment divider, which is a generally inverted frustoconical shape, and which is attached near said top end of said generally cylindrical core shroud and which extends toward said floor of said housing and is attached to said interior side of said housing, and which divides said housing into a second air chamber above said first air chamber, and which forms a large debris collection basin adjacent to said housing in said second air chamber;
an air outlet which penetrates said housing from inside said cyclonic chamber, and which is attached to said cyclonic chamber;
a means of removing accumulated particulate debris from said first and second air chambers; and
an air propulsion means for propelling air through said vacuum housing and out said air outlet;
wherein said air propulsion means propels air through said air inlet in said housing, and as air enters said spiral ramp said air is forced into a spiral path through said spiral ramp, and said generally cylindrical core shroud, and entrained particulates in air are forced to a periphery of said spiral ramp by centrifugal force, and said particulates are excluded from said cyclonic chamber of said generally cylindrical core shroud to said air chamber by said means of excluding particulates from said cyclonic chamber, and when air passes from said housing through said air outlet it is substantially debris free.

21. The vortex particle separator of claim 20 in which said means for excluding said particulates from said cyclonic chamber is an air gap between an inlet for said cyclonic chamber and said air inlet to said housing, wherein a vortex is formed from a suction creating means adjacent to said air outlet pulling air through said cyclonic chamber, and said vortex extending beyond said cyclonic chamber inlet, so that before air enters said cyclonic chamber, larger particulates in said air stream are thrown out of said air stream and do not enter said cyclonic chamber.

22. The vortex particle separator of claim 20 in which said means for excluding said particulates from said cyclonic chamber is at least one debris opening in said generally cylindrical core shroud which opens into said first air chamber, and at least one debris opening in said generally cylindrical core shroud which opens into said second air chamber, so that after air enters said cyclonic chamber, particulates in said air stream are thrown out of said generally cylindrical core shroud and into said first and second air chamber.

23. The vortex particle separator of claim 20 which further includes a deflector plate which encircles said generally cylindrical core shroud, and which forms an entrapment region in said first air chamber.

24. The vortex particle separator of claim 20 which further comprises a cyclonic chamber cap with a top surface and a bottom surface, which covers said cyclonic chamber with said bottom surface of said cyclonic chamber cap facing said cyclonic chamber, and said top surface of said cyclonic chamber cap facing said air inlet, and which allows air to enter said cyclonic chamber through one or more air passages between said bottom surface and said generally cylindrical core shroud.

25. The vortex particle separator of claim 20 in which said top of housing is an attached plate with an air inlet defined therein.

26. The vortex particle separator of claim 20 in which said bottom of housing is removable and serves as a means of debris removal.

27. The vortex particle separator of claim 20 in which said housing splits open and serves as a means of debris removal.

28. The vortex particle separator of claim 20 which further includes a particulate filter mounted adjacent said air outlet.

29. The vortex particle separator of claim 20 in which said housing is a bag.

30. The vortex particle separator of claim 29 in which said bag is a porous bag.

31. The vortex particle separator of claim 29 in which said bag is a porous cloth bag.

32. The vortex particle separator of claim 30 in which said bag is a porous paper bag.

33. The vortex particle separator of claim 22 in which said suction creating means is mounted adjacent said air outlet and pulls air through said cyclonic chamber.

34. The vortex particle separator of claim 22 in which said motor is mounted adjacent said air inlet and pushes air through said cyclonic chamber.

35. The vortex particle separator of claim 20 in which said spiral ramp decreases in radius in order to increase air speed so that smaller particulates may be removed from said air stream.

36. The vortex particle separator of claim 20 in which a pitch of said spiral ramp decreases from said top end of said spiral ramp to said bottom end of said spiral ramp, in order to increase air speed toward said bottom end, so that smaller particulates may be removed from said air stream.

37. The vortex particle separator of claim 20 which said spiral ramp further comprises a central core, to which is attached said inner edges of said spiral ramp, and a diameter of said inner core is smaller at said top end, and becomes larger at said bottom end, for increasing air speed in said cyclonic chamber so that smaller particles may be removed from said air stream.

38. The vortex particle separator of claim 37 which further includes a deflector plate which encircles said generally cylindrical core shroud, and which forms an entrapment region in said first air chamber.

39. The vortex particle separator of claim 37 which further comprises a cyclonic chamber cap with a top surface and a bottom surface, which covers said cyclonic chamber with said bottom surface of said cyclonic chamber cap facing said cyclonic chamber, and said top surface of said cyclonic chamber cap facing said air inlet, and which allows air to enter said cyclonic chamber through one or more air passages between said bottom surface and said generally cylindrical core shroud.

40. The vortex particle separator of claim 37 in which said top of housing is an attached plate with an air inlet defined therein.

41. The vortex particle separator of claim 37 in which said bottom of housing is removable and serves as a means of debris removal.

42. The vortex particle separator of claim 37 in which said housing splits open and serves as a means of debris removal.

43. The vortex particle separator of claim 37 which further includes a particulate filter mounted adjacent said air outlet.

44. The vortex particle separator of claim 37 which further includes a means of increasing air speed through said cyclonic chamber.

45. The vortex particle separator of claim 37 in which said first divider wall further comprises a cylindrical region and a frustoconical region.

46. A vortex particle separator for removing entrained particulate debris from air, comprising:
 a housing, with at least one sidewall, a top end and a bottom end;
 an air inlet in said housing, for entry of air into said housing;
 a cyclonic chamber, comprising
  a spiral ramp enclosed by a generally cylindrical core shroud, in which said spiral ramp includes a top end, and bottom end, and an inside edge and an outside edge, and said spiral ramp is adjacent to but spaced apart from said air inlet;
  said generally cylindrical core shroud including a top and a bottom, an interior surface and an exterior surface, with said generally cylindrical core shroud surrounding and enclosing said spiral ramp, with said interior surface of said generally cylindrical core shroud positioned adjacent to said outside edge of said spiral ramp;
  with said cyclonic chamber confining air to a path formed by said spiral ramp, and thereby forming a spiral and confined route for air movement through said cyclonic chamber;
 a first divider wall, which surrounds said generally cylindrical core shroud and is attached to said top end of said generally cylindrical core shroud and said housing floor, and is spaced apart from said air inlet, and which forms a large particle compartment between said first divider wall and said housing sidewall;
 a raised base which is formed in said housing floor, which comprises a cylinder which extends from said housing floor toward said housing top and which attaches to said bottom of said generally cylindrical core shroud, and in which an air outlet is defined;
 a second divider wall, which is interior to said first divider wall, and which surrounds said raised base and a lower portion of said generally cylindrical core shroud and which is attached to said generally cylindrical core shroud and said housing floor, and which forms a medium sized particle compartment between said first compartment divider wall and said second compartment divider wall, and which forms a fine particle compartment between said second compartment divider wall and said raised base;
 a plurality of debris openings in said generally cylindrical core shroud, for passage of particulate debris from inside said generally cylindrical core shroud to outside said generally cylindrical core shroud and into said medium and fine particle collection chambers;
 a means of removing accumulated particulate debris from said large, medium and fine particle collection chambers; and
 a motor with a fan for pulling air through said vacuum housing and out said air outlet;

wherein said motor and said fan pull air through said spiral ramp, forming a vortex between said spiral ramp and said air inlet in said housing, and as air enters said air inlet, large debris is thrown out of said vortex into said large particle collection chamber, the air then entering said spiral ramp and being forced into an enclosed spiral path through said spiral ramp and said generally cylindrical core shroud, with entrained debris in air being forced to the periphery of said spiral ramp by centrifugal force, and medium sized particulates passing from said cyclonic chamber of said generally cylindrical core shroud to said medium particle collection chamber, and fine particulates passing from said cyclonic chamber of said generally cylindrical core shroud to said fine particle collection chamber, with air which is substantially particulate free passing from said cyclonic chamber into said raised base, through said air outlet, and out of said housing.

47. A vortex particle separator, for separating entrained particulates from air, comprising:

a vacuum housing, with at least one sidewall, a top end and a bottom end;

at least one air inlet in said housing, for entry of air into said housing;

at least one spiral ramp enclosed by a generally cylindrical core shroud, in which said spiral ramp comprises a top end, and bottom end, and an inside edge and an outside edge, and is positioned in a spaced apart relationship with said air inlet;

said generally cylindrical core shroud comprising a sidewall with an interior surface and an exterior surface, and surrounding and enclosing said spiral ramp, with said interior surface of said generally cylindrical core shroud adjacent to said outside edge of said spiral ramp and thereby confining air to a path formed by said spiral ramp, with said generally cylindrical core shroud forming an air chamber between said housing and said exterior surface of said generally cylindrical core shroud, and forming a cyclonic chamber inside said generally cylindrical core shroud, and in which said spiral ramp provides a spiral route for air movement through said cyclonic chamber;

a top portion of said housing;

a bottom portion of said housing;

an air gap between said inlet for said cyclonic chamber and said air inlet to said housing, wherein a vortex is formed inside said spiral ramp and adjacent to said cyclonic chamber from a suction creating unit adjacent said air outlet pulling air through said cyclonic chamber, with said vortex extending beyond said cyclonic chamber inlet into said air gap and toward said air inlet, so that when air enters said air gap between said cyclonic chamber and said air inlet, particulates in said air stream are thrown out of said air stream and do not enter said cyclonic chamber;

a suction creating unit for propelling air through said vacuum housing and out said air outlet; and an operative connection between said suction creating and said cyclonic chamber.

* * * * *